US012729521B2

(12) United States Patent
Erickson et al.

(10) Patent No.: US 12,729,521 B2

(45) Date of Patent: Sep. 8, 2026

(54) FAUCET BEARING ASSEMBLY

(71) Applicant: Kohler Co., Kohler, WI (US)

(72) Inventors: Perry D. Erickson, Sheboygan, WI (US); Steven Thomas Radder, Kiel, WI (US)

(73) Assignee: Kohler Co., Kohler, WI (US)

( * ) Notice: Subject to any disclaimer, the term of this patent is extended or adjusted under 35 U.S.C. 154(b) by 13 days.

(21) Appl. No.: 18/926,780

(22) Filed: Oct. 25, 2024

(65) Prior Publication Data

US 2025/0163688 A1 May 22, 2025

Related U.S. Application Data

(60) Provisional application No. 63/600,208, filed on Nov. 17, 2023.

(51) Int. Cl.

*E03C 1/04* (2006.01)
*F16C 23/04* (2006.01)
*F16L 27/08* (2006.01)

(52) U.S. Cl.

CPC ............ *E03C 1/0404* (2013.01); *F16C 23/04* (2013.01); *F16L 27/08* (2013.01); *E03C 2001/0414* (2013.01)

(58) Field of Classification Search

CPC ........... E03C 1/0404; E03C 2001/0414; Y10T 137/9464; F16C 23/04; F16L 27/08

See application file for complete search history.

(56) References Cited

U.S. PATENT DOCUMENTS

| | | | | |
|---|---|---|---|---|
| 5,718,517 | A | 2/1998 | Morando | |
| 7,344,313 | B2 | 3/2008 | Hansen et al. | |
| 8,061,386 | B2 * | 11/2011 | Mueller | F16L 27/082 285/281 |
| 8,540,433 | B2 | 9/2013 | Wenderberg et al. | |
| 8,764,295 | B2 | 7/2014 | Dadson et al. | |
| 8,939,652 | B2 | 1/2015 | Peterson et al. | |
| 9,510,654 | B2 | 12/2016 | Meersschaert | |
| 2007/0295418 | A1 * | 12/2007 | Leutwyler | F16B 21/183 137/615 |
| 2010/0175765 | A1 * | 7/2010 | Andersen | E03C 1/0404 4/678 |
| 2022/0373024 | A1 | 11/2022 | Molinelli et al. | |
| 2023/0212844 | A1 * | 7/2023 | Hayes | F16L 37/0926 4/695 |
| 2023/0332641 | A1 * | 10/2023 | Moyes | F16C 17/08 |

* cited by examiner

*Primary Examiner* — Kelsey E Cary

(74) *Attorney, Agent, or Firm* — Husch Blackwell LLP

(57) ABSTRACT

A fluid delivery system including a first and a second faucet tube coupled with a swivel bearing assembly wherein the first faucet tube is rotatable relative the second faucet tube about the swivel bearing and a portion of the swivel bearing is configured to be at least partially tapered at a distal end to provide a sealing resistance between a fastener and a coupling member of the swivel bearing assembly.

18 Claims, 3 Drawing Sheets

FAUCET BEARING ASSEMBLY

CROSS-REFERENCE TO RELATED APPLICATION

The present disclosure claims the benefit of U.S. Provisional Application No. 63/600,208, filed Nov. 17, 2023, which is hereby fully incorporated by reference in its entirety.

FIELD

The present technology is generally related to the field of faucets including spouts that may be rotatable or otherwise moved into alternative positions. More particularly, the present disclosure relates to a spout rotatable about a bearing coupled between first and second faucet tubes.

BACKGROUND

Conventional faucets have a faucet body, one or more flow control/mixing valves, one or more control handles, and a spout. The spout acts as a conduit for expelling water that has passed through the valve(s), in which case the outflow is either fixed to begin at a single point, or in the case of a pivotal spout, is limited to begin over a range of a prescribed horizontal arc.

Kitchen sinks or other various faucet outlets typically have faucets positioned near the back counter of a sink basin or positioned at the back deck thereof. Some kitchen sinks may include a relatively wide sink basin or include multiple sink basins. Thus, it is often desirable to include a faucet spout to have the capabilities to pivot, swivel, or otherwise be rotatable in order to direct fluid between sink basins, to particular parts of the sink, or to direct fluid flow to alternative objects, whether within the sink basin or outside of the sink basin (e.g., to fill or wash large objects, such as a pot filler, objects on a countertop or stove, etc.).

Some, more elaborate faucets, may include a plurality of joints for rotatability to allow for multiple pivotable angles. For example, pot filler type faucets may typically incorporate a plurality of joints to allow for the outlet of the faucet to reach a substantial distance to fill a pot placed on a nearby stove or countertop. Such jointed articulating faucets can present challenges related to sealing between the moveably connected components and the connected communication of fluid within those components. These complexities can result in potential leaks or failures in the system. Moreover, these multiple joints can include a large number of intermingled components, which may cause additional complexities and failures. Also, separate fasteners are ordinarily needed to install the valve assembly in the faucet body. These concerns can significantly increase the cost of production of the faucet, complexity of installation, cause additional potential for leaks and breakdowns, etc. Moreover, the types of assemblies can take up a large amount of space above or near the sink.

Thus, there is a need for improved swiveling spouts that can incorporate an internal fluid flow without the need for multiple and complex joint or swivel integration.

SUMMARY

Non-limiting examples of the present disclosure provide for faucets including spouts that may be rotatable or otherwise moved into alternative positions about a bearing coupled between a first and second faucet tube, for example, in relation to pot filler faucet configurations.

One example of the present disclosure provides a fluid delivery system including a first and a second faucet tube coupled with a swivel bearing assembly wherein the first faucet tube is rotatable relative the second faucet tube about a swivel bearing of the swivel bearing assembly, wherein a portion of the swivel bearing is configured to be at least partially tapered at a distal end to provide a sealing resistance between a fastener and a coupling member coupled within the second faucet tube.

One example of the present disclosure provides a fluid delivery system including a faucet spout having a first faucet tube and a second faucet tube, and a swivel bearing assembly coupled to the first and second faucet tubes, the swivel bearing assembly having a first swivel bearing and a fastener extending from the first faucet tube to the second faucet tube, wherein the first faucet tube is rotatable relative to the second faucet tube about the first swivel bearing, wherein the fastener exerts a pressure against the first swivel bearing to secure the swivel bearing assembly within the first and second faucet tubes.

In examples, a portion of the first swivel bearing can be at least partially tapered at a distal end to provide a sealing resistance between the fastener and a coupling mechanism positioned within the second faucet tube, wherein the fastener can extend the tapered distal end of the first swivel bearing from a relaxed position to an extended position to secure the swivel bearing assembly within the first and second faucet tubes. In examples, the swivel bearing assembly may further include one or more O-rings positioned between the first swivel bearing and the coupling mechanism, the one or more O-rings configured to provide a liquid seal between the first and second faucet tubes. In examples, the first swivel bearing can be positioned between the fastener and the coupling mechanism. In examples, the fastener can be threaded at a distal portion, the distal portion being securely coupled to the first faucet tube.

In examples, the fastener may define a flow passageway extending from a first fastener end to a second fastener end, the first fastener end being couplable to the first faucet tube, the second fastener end being couplable to the second faucet tube, wherein the flow passageway can enable fluid communication between the first faucet tube and the second faucet tube. In examples, the swivel bearing assembly may further include a wear washer positioned and sized to engage the first faucet tube, the wear washer configured to inhibit surface wear and deterioration caused by repeated rotational motion of the first faucet tube relative to the second faucet tube. In examples, the swivel bearing assembly may further include a second swivel bearing positioned opposite the first swivel bearing, wherein the first swivel bearing can be positioned proximate the first faucet tube and the second swivel bearing can be positioned proximate the second faucet tube.

In examples, the fluid delivery system may further include one or more inlet lines coupled to the faucet, the one or more inlet lines including at least one of a hot inlet line, a cold inlet line, and a combination hot and cold inlet line, wherein fluid can be configured to flow through the one or more inlet lines and into the fluid delivery system. In examples, fluid can flow from the first faucet tube to a passageway defined in the swivel bearing assembly, and from the passageway in the swivel bearing assembly to the second faucet tube, thereby enabling fluid communication between the first and second faucet tubes. In examples, the fastener can be concentrically aligned with the first and second faucet tubes. In examples, the first and second faucet tubes may collectively define a flow passageway for receiving fluid. In examples, the swivel bearing assembly can be coupled to the first and second faucet tubes via at least one of an adhesive material, brazing, welding, and threading.

One example of the present disclosure provides a swivel bearing assembly for use with a fluid delivery system having a faucet spout with a first faucet tube and a second faucet tube. The swivel bearing assembly may include a fastener defining a flow passageway, a coupling mechanism proximate the fastener, and a first swivel bearing positioned between the fastener and the coupling mechanism, wherein the fastener can extend through the coupling mechanism and the first swivel bearing, wherein fluid can be configured to flow through the flow passageway of the fastener when used with a fluid delivery system, wherein the swivel bearing assembly can be configured to enable rotation between a first faucet tube relative to a second faucet tube, thereby enabling swivel motion of a faucet spout during fluid flow from the first faucet tube to the second faucet tube through the swivel bearing assembly.

In examples, a portion of the first swivel bearing can be at least partially tapered at a distal end to provide a sealing resistance between the fastener and the coupling mechanism. In examples, the swivel bearing assembly can further include a wear washer configured to inhibit surface wear and deterioration caused by repeated use of the swivel bearing assembly. In examples, the swivel bearing assembly can further include a second swivel bearing positioned opposite the first swivel bearing. In examples, the swivel bearing assembly can further include one or more O-rings positioned between the first swivel bearing and the coupling mechanism, the one or more O-rings configured to provide a liquid seal between the first swivel bearing and the coupling mechanism. In examples, the fastener, the coupling mechanism, and the first swivel bearing can be concentrically aligned. In examples, the fastener can be threaded at an end distal from the first swivel bearing.

One example of the present disclosure provides a method for rotatably repositioning a fluid outlet system, comprising coupling a first faucet tube and a second faucet tube together, wherein a swivel bearing assembly is coupled within and therebetween; and rotating the first faucet tube relative to the second faucet tube about a swivel bearing of the swivel bearing assembly.

In examples, the swivel bearing assembly provided in a method for rotatably repositioning a fluid outlet system may include a wear washer positioned and sized to engage the first faucet tube, the wear washer configured to inhibit surface wear and deterioration caused by repeated rotational motion of the first faucet tube relative to the second faucet tube. In examples, the swivel bearing assembly provided in a method for rotatably repositioning a fluid outlet system may include a second swivel bearing positioned opposite the first swivel bearing, wherein the first swivel bearing can be positioned proximate the first faucet tube and the second swivel bearing can be positioned proximate the second faucet tube.

The summary above is not intended to describe each illustrated example or every implementation of the present disclosure. The figures and the detailed description that follow more particularly exemplify these examples.

BRIEF DESCRIPTION OF THE DRAWINGS

Subject matter hereof may be more thoroughly understood in consideration of the following detailed description of various examples in connection with the accompanying figures, in which.

Figure 1:
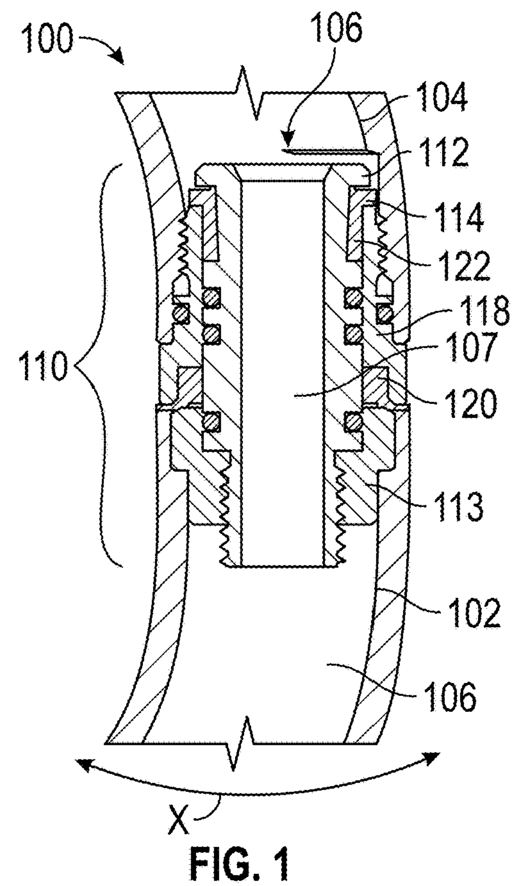
FIG. 1 depicts a cross-sectional view of a faucet bearing assembly integrated within a faucet system, according to examples.

While various examples are amenable to various modifications and alternative forms, specifics thereof have been shown by way of example in the drawings and will be described in detail. It should be understood, however, that the intention is not to limit the claimed inventions to the particular examples described. On the contrary, the intention is to cover all modifications, equivalents, and alternatives falling within the spirit and scope of the subject matter of the present disclosure.

DETAILED DESCRIPTION

Figure 2:
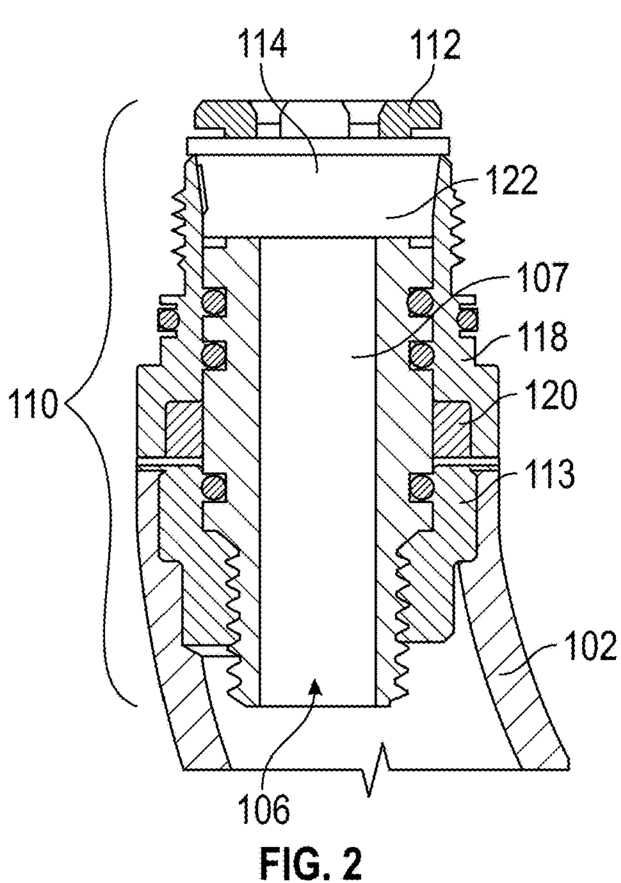
FIG. 2 depicts a cross-sectional view of the faucet bearing assembly integrated within the faucet system, according to examples.

FIGS. 1 and 2 depict cross sectional views of an example faucet bearing assembly integrated within a faucet spout. In examples, faucet spout 100 may include a first faucet tube 102 and a second faucet tube 104 in which a swivel faucet assembly 110 may be coupled therebetween and within. The first and second faucet tubes 102 and 104 may define a flow passage 106, in which fluid (e.g., water from inlet valves) may flow through. During operation, fluid may flow from one or more inlet lines, for example, including hot, cold, or a combination thereof, through the neck of the faucet (not shown) until it reaches the swivel bearing assembly 110. Flow of the liquid may pass through the flow passageway 106, which may be defined within the first and second faucet tubes 102 and 104, through the swivel bearing assembly 110, via passageway 107 of the swivel bearing assembly 110, and output through an outlet (not shown).

The swivel bearing assembly 110 may allow the first faucet tube 102 to pivot or otherwise rotate with respect to the second faucet tube 104. In examples, the swivel bearing assembly 110 may include a fastener 112 that may be driven into the first faucet tube 102. In examples, the fastener 112 may be threaded at the distal portion such that a secure fitting within the first faucet tube 102 may be achieved. In examples, the fastener 112 may be alternatively shaped or designed such that the fastener 112 may be pressed or otherwise pushed into the first faucet tube 102 to provide a secure and liquid seal between the first faucet tube 102, second faucet tube 104 and the swivel bearing assembly 110. In examples, additional or alternative measures may be made to secure the swivel bearing assembly 110 between the first and second tubes 102 and 104. In examples, the swivel bearing assembly 110 and/or components that are secured to either the first or second faucet tube 102 or 104 may be coupled with an adhesive material, brazed 113, welded, threaded, or otherwise secured and sealed together.

In examples, the swivel bearing assembly 110 may extend between the first faucet tube 102 and the second faucet tube 104 and may be hollow to define flow passageway 107. Thus, flow passageway 107 may extend between each respective end of the fastener 112 to allow for fluid communication between the first faucet tube 102 and the second faucet tube 104. The fastener 112 may be concentrically aligned with the first faucet tube 102 and second faucet tube 104, although other shapes and configurations are contemplated. The fastener 112 may be fixed relative to the second faucet tube 104, while allowing rotation of the first faucet tube 102 relative to the second faucet tube 104. While alternative configurations and rotatabilities are contemplated relative to alternative shapes and configurations of faucets, in examples, rotation can be achieved about axis X.

Figure 3:
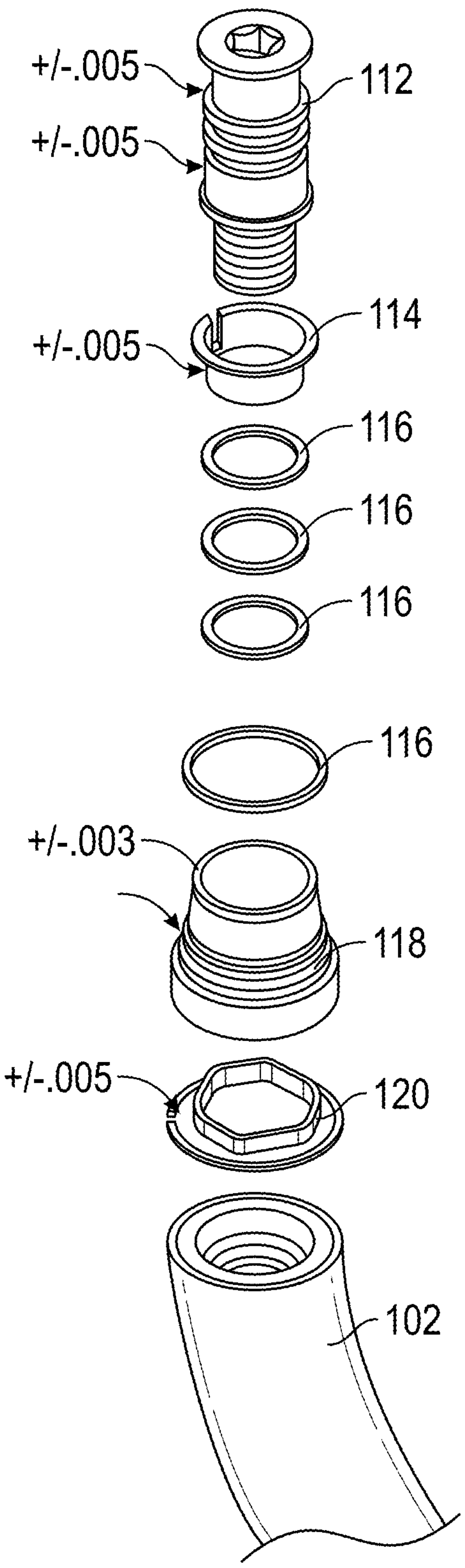
FIG. 3 depicts an exploded view of a faucet bearing assembly, according to examples.

FIG. 3 depicts an exploded view of the swivel bearing assembly, according to examples. The swivel bearing assembly 110 may include the swivel bearing 114, one or more O-rings 116, the second faucet tube 104 coupling mechanism 118, and one or more wear washers 120. In examples, fastener 112 may be threaded or otherwise pushed through the bearing 114, one or more O-rings 116, coupling mechanism 118, and the wear washer 120. The fastener 112 may then be received into the first faucet tube 102, whether via threading or otherwise pressed into the first faucet tube 102. In examples, the coupling provides a secure connection between the first and second faucet tubes 102 and 104, while providing a liquid seal for fluid flow through the second faucet tube 104, passageway 107, and out through the first faucet tube 102. In examples, the coupling mechanism 118 may be threaded or otherwise couplable such that the fastener 112 may be rotatably inserted or pressed into the second faucet tube 104 to provide a secure coupling and liquid seal between the swivel bearing assembly 110 and the second faucet tube 104. In examples, the one or more O-rings 116 may aid in providing a liquid seal for the faucet spout and may be disposed between one or more components of the swivel bearing assembly 110, e.g., between the bearing 114 and coupling mechanism 118.

In examples, wear washer 120 may be similarly cylindrical in shape and sized to engage the swivel bearing assembly 110, the first faucet tube 102, and the second faucet tube 104. The wear washer 120 may be positioned such that, during use and between pivotable rotation of the first faucet tube 102 relative to the second faucet tube 104, surface wear or other deterioration may be reduced or prevented from the rotational motion. Thus, continued use of the swivel bearing assembly 110 may be prolonged.

Figure 4:
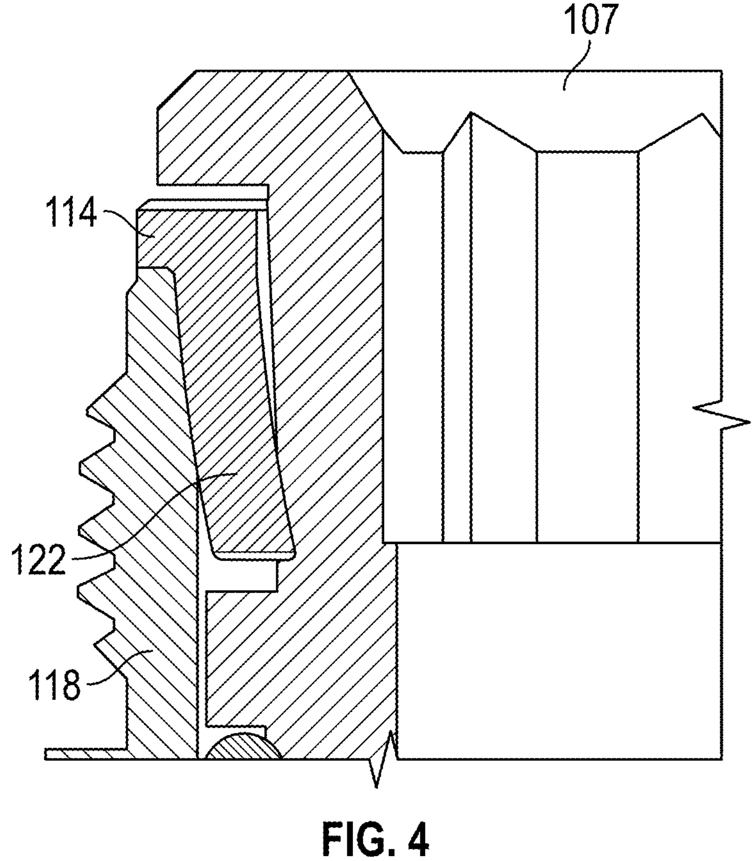
FIG. 4 depicts a close-up cross-sectional view of the faucet bearing assembly, according to examples.

FIG. 4 depicts a close-up cross-sectional view of the faucet bearing assembly, according to examples. In examples, rotation of the first faucet tube 102 may be achieved by bearing 114. Bearing 114 may be coupled between fastener 112 and coupling mechanism 118 when integrated into a faucet or other alternative fluid delivery configurations. In examples, bearing 114 may be constructed in an “L” like shape, which may be configured to be tapered or curved at a distal end 122. In examples, when integrated or otherwise coupled together between the first and second faucet tubes 102 and 104, the tapered nature of bearing 114 may exert pressure onto fastener 112. The fastener 112, when inserted into the first faucet tube 102, through coupling mechanism 118 and any other components as described herein, may extend the tapered portion 122 of the bearing 114 out of its normal, relaxed position, which may exert a constant pressure onto the fastener 112 and extend the tapered portion out of its original shape. In examples, the tapered portion 122 may conform to and be positioned within the space between the fastener 112 and coupling mechanism 118 after installation and during use. Thus, the combination between the tapered portion 122 of the bearing 114 and the constant pressure resulting from the resistance in the shape of the inserted fastener 112, the swivel bearing assembly 110 may be further secured in place within the first and second faucet tubes 102 and 104. In examples, the second faucet tube 104 and fastener 112 may be in a fixed position while first faucet tube 102, coupling mechanism 118 may be rotatable relative to the other components of the faucet about bearing 114.

In examples, while a majority of the faucet may be constructed of a metal material, e.g., copper, aluminum, chrome, steel, etc., other components among the swivel bearing assembly 110 may be constructed of a polymer material, such as plastic. For example, bearing 114 may be constructed of a plastic material such that it may be light weight and durable, while still enabling the flexibility to enable the tapered portion 122 to provide enough resistance, pressure, and flexibility to further couple the first tube 102, fastener 112, and coupling mechanism 118. In examples, fastener 112, O-rings, 116, coupling mechanism 118, and wear washer 120 may also be constructed of a polymer material, such as plastic.

In examples, the swivel bearing assembly 110 may be incorporated into faucets designed as pot fillers, in which the first faucet tube 102, may be rotatable relative to the second faucet tube 104, about bearing 114, to extend, transition, or otherwise rotate the outlet faucet beyond a basin of the sink (not shown). Thus, the rotatability may allow for additional extension or access for the outlet of the faucet to reach additional locations beyond the sink basin (e.g., to make it easier for a user to fill a large pot or pan with liquid that may not otherwise be normally positioned within the sink or generally have an ease of access to the fluid outlet). While example integrations of the swivel bearing assembly 110 have included integration within pot filler type faucets, it should be understood that alternative faucet configurations utilizing the swivel bearing assembly 110 are contemplated.

In examples, the wear washer 120 in swivel bearing assembly 110, depicted in FIGS. 1-3, may be replaced with a second bearing 114. Specifically, fastener 112 of swivel bearing assembly 110 may be threaded or otherwise pushed through a first bearing 114, one or more O-rings 116, coupling mechanism 118, and a second bearing 114. Second bearing 114 can be inverted relative to first bearing 114 such that the two bearings 114 are opposite each other within swivel bearing assembly 110 (e.g., first bearing 114 may taper toward second bearing 114, and vice versa). Fastener 112 may then be received into the first faucet tube 102, whether via threading or otherwise pressed into the first faucet tube 102, as previously described. Examples with second bearing 114 in place of wear washer 120 may provide improved lifetime wear, reduced end-of-life spout wobble, and the creation of a stronger joint suitable for heavier faucets with increased wear.

It should be understood that the individual operations used in the methods of the present teachings may be performed in any order and/or simultaneously, as long as the teaching remains operable. Furthermore, it should be understood that the apparatus and methods of the present teachings can include any number, or all, of the described examples, as long as the teaching remains operable.

Various examples of systems, devices, and methods have been described herein. These examples are given only by way of example and are not intended to limit the scope of the claimed inventions. It should be appreciated, moreover, that the various features of the examples that have been described may be combined in various ways to produce numerous additional examples. Moreover, while various materials, dimensions, shapes, configurations and locations, etc. have been described for use with disclosed examples, others besides those disclosed may be utilized without exceeding the scope of this disclosure.

Persons of ordinary skill in the relevant arts will recognize that the subject matter hereof may comprise fewer features than illustrated in any individual example described above. The examples described herein are not meant to be an exhaustive presentation of the ways in which the various features of the subject matter hereof may be combined. Accordingly, the examples are not mutually exclusive combinations of features; rather, the various examples can comprise a combination of different individual features selected from different individual examples, as understood by persons of ordinary skill in the art. Moreover, elements described with respect to one example can be implemented in other examples even when not described in such examples unless otherwise noted.

Although a dependent claim may refer in the claims to a specific combination with one or more other claims, other examples can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A fluid delivery system, comprising:

a faucet spout having a first faucet tube and a second faucet tube; and a swivel bearing assembly coupled to the first and second faucet tubes, the swivel bearing assembly having a first swivel bearing and a fastener extending from the first faucet tube to the second faucet tube, wherein the first faucet tube is rotatable relative to the second faucet tube about the first swivel bearing, wherein the fastener exerts a pressure against the first swivel bearing to secure the swivel bearing assembly within the first and second faucet tubes, and wherein a portion of the first swivel bearing is at least partially tapered at a distal end to provide a sealing resistance between the fastener and a coupling member positioned within the second faucet tube, wherein the fastener extends the tapered distal end of the first swivel bearing from a relaxed position to an extended position to secure the swivel bearing assembly within the first and second faucet tubes.

2. The fluid delivery system of claim 1, wherein the swivel bearing assembly further comprises one or more O-rings positioned between the first swivel bearing and the coupling member, the one or more O-rings configured to provide a liquid seal between the first and second faucet tubes.

3. The fluid delivery system of claim 1, wherein the first swivel bearing is positioned between the fastener and the coupling member.

4. The fluid delivery system of claim 1, wherein the fastener is threaded at a distal portion, the distal portion being securely coupled to the first faucet tube.

5. The fluid delivery system of claim 1, wherein the fastener defines a flow passageway extending from a first fastener end to a second fastener end, the first fastener end coupled to the first faucet tube, the second fastener end coupled to the second faucet tube, wherein the flow passageway enables fluid communication between the first faucet tube and the second faucet tube.

6. The fluid delivery system of claim 1, wherein the swivel bearing assembly further comprises a wear washer positioned and sized to engage the first faucet tube, the wear washer configured to inhibit surface wear and deterioration caused by repeated rotational motion of the first faucet tube relative to the second faucet tube.

7. The fluid delivery system of claim 1, wherein the swivel bearing assembly further comprises a second swivel bearing positioned opposite the first swivel bearing, wherein the first swivel bearing is positioned proximate the first faucet tube and the second swivel bearing is positioned proximate the second faucet tube.

8. The fluid delivery system of claim 1, further comprising one or more inlet lines coupled to the faucet, the one or more inlet lines comprises at least one of a hot inlet line, a cold inlet line, and a combination hot and cold inlet line, wherein fluid is configured to flow through the one or more inlet lines and into the fluid delivery system.

9. The fluid delivery system of claim 1, wherein fluid flows from the first faucet tube to a passageway defined in the swivel bearing assembly, and from the passageway in the swivel bearing assembly to the second faucet tube, thereby enabling fluid communication between the first and second faucet tubes.

10. A swivel bearing assembly for use with a fluid delivery system having a faucet spout with a first faucet tube and a second faucet tube, comprising:

a fastener defining a flow passageway;

a coupling member proximate the fastener; and a first swivel bearing positioned between the fastener and the coupling member, wherein the fastener extends through the coupling member and the first swivel bearing, wherein fluid is configured to flow through the flow passageway of the fastener when used with a fluid delivery system, wherein the swivel bearing assembly is configured to enable rotation between a first faucet tube relative to a second faucet tube, thereby enabling swivel motion of a faucet spout during fluid flow from the first faucet tube to the second faucet tube through the swivel bearing assembly, and wherein a portion of the first swivel bearing is at least partially tapered at a distal end to provide a sealing resistance between the fastener and the coupling member, wherein the fastener extends the tapered distal end of the first swivel bearing from a relaxed position to an extended position to secure the swivel bearing assembly within the first and second faucet tubes.

11. The swivel bearing assembly of claim 10, wherein the swivel bearing assembly further comprises a wear washer configured to inhibit surface wear and deterioration caused by repeated use of the swivel bearing assembly.

12. The swivel bearing assembly of claim 10, wherein the swivel bearing assembly further comprises a second swivel bearing positioned opposite the first swivel bearing.

13. The swivel bearing assembly of claim 10, further comprising one or more O-rings positioned between the first swivel bearing and the coupling member, the one or more O-rings configured to provide a liquid seal between the first swivel bearing and the coupling member.

14. The swivel bearing assembly of claim 10, wherein the fastener, the coupling member, and the first swivel bearing are concentrically aligned.

15. The swivel bearing assembly of claim 10, wherein the fastener is threaded at an end distal from the first swivel bearing.

16. A method for rotatably repositioning a fluid outlet system, comprising:

providing a fluid delivery system comprising a faucet spout having a first faucet tube and a second faucet tube, the fluid delivery system further comprising a swivel bearing assembly coupled to the first and second faucet tubes, the swivel bearing assembly having a first swivel bearing and a fastener extending from the first faucet tube to the second faucet tube, wherein the fastener exerts a pressure against the first swivel bearing to secure the swivel bearing assembly within the first and second faucet tubes, wherein a portion of the first swivel bearing is at least partially tapered at a distal end to provide a sealing resistance between the fastener and the coupling member, wherein the fastener extends the tapered distal end of the first swivel bearing from a relaxed position to an extended position to secure the swivel bearing assembly within the first and second faucet tubes; and rotating the first faucet tube relative to the second faucet tube about the first swivel bearing, thereby enabling swivel motion of the faucet spout during fluid flow from the first faucet tube to the second faucet tube through the swivel bearing assembly.

17. The method of claim 16, wherein the swivel bearing assembly further comprises a wear washer positioned and sized to engage the first faucet tube, the wear washer configured to inhibit surface wear and deterioration caused by repeated rotational motion of the first faucet tube relative to the second faucet tube.

18. The method of claim 16, wherein the swivel bearing assembly further comprises a second swivel bearing positioned opposite the first swivel bearing, wherein the first swivel bearing is positioned proximate the first faucet tube and the second swivel bearing is positioned proximate the second faucet tube.

* * * * *